United States Patent
Kim et al.

(10) Patent No.: US 9,287,581 B2
(45) Date of Patent: Mar. 15, 2016

(54) SODIUM-SULFUR DIOXIDE SECONDARY BATTERY AND METHOD OF MANUFACTURING THE SAME

(71) Applicant: KOREA ELECTRONICS TECHNOLOGY INSTITUTE, Seongnam-si, Gyeonggi-do (KR)

(72) Inventors: Young Jun Kim, Seongnam-si (KR); Goo Jin Jeong, Seongnam-si (KR); Han Su Kim, Seoul (KR)

(73) Assignee: KOREA ELECTRONICS TECHNOLOGY INSTITUTE, Seoul (KR)

( * ) Notice: Subject to any disclaimer, the term of this patent is extended or adjusted under 35 U.S.C. 154(b) by 0 days.

(21) Appl. No.: 14/469,855

(22) Filed: Aug. 27, 2014

(65) Prior Publication Data

US 2015/0099194 A1    Apr. 9, 2015

(30) Foreign Application Priority Data

Oct. 8, 2013    (KR) .................... 10-2013-0119666

(51) Int. Cl.
| | |
|---|---|
| H01M 10/054 | (2010.01) |
| H01M 4/134 | (2010.01) |
| H01M 4/40 | (2006.01) |
| H01M 10/04 | (2006.01) |
| H01M 4/38 | (2006.01) |
| H01M 4/58 | (2010.01) |
| H01M 10/0563 | (2010.01) |
| H01M 4/583 | (2010.01) |
| H01M 4/02 | (2006.01) |

(52) U.S. Cl.
CPC ............ *H01M 10/054* (2013.01); *H01M 4/134* (2013.01); *H01M 4/381* (2013.01); *H01M 4/40* (2013.01); *H01M 4/582* (2013.01); *H01M 4/583* (2013.01); *H01M 10/04* (2013.01); *H01M 10/0563* (2013.01); *H01M 2004/027* (2013.01); *H01M 2300/002* (2013.01); *Y10T 29/49108* (2015.01)

(58) Field of Classification Search
None
See application file for complete search history.

(56) References Cited

U.S. PATENT DOCUMENTS

| | | | | |
|---|---|---|---|---|
| 4,891,281 | A | | 1/1990 | Kuo et al. |
| 5,213,914 | A | * | 5/1993 | Heitbaum et al. ............. 429/346 |
| 5,352,546 | A | * | 10/1994 | Chua et al. ..................... 429/101 |

FOREIGN PATENT DOCUMENTS

| | | |
|---|---|---|
| DE | 3318981 A1 | 11/1984 |
| DE | 3604541 A1 | 8/1987 |

(Continued)

OTHER PUBLICATIONS

Korean Notice of Allowance for corresponding Korean Application No. 10-2013-0119666 dated Apr. 30, 2015, citing the above reference(s).

(Continued)

*Primary Examiner* — Gregg Cantelmo
(74) *Attorney, Agent, or Firm* — Hauptman Ham, LLP (57) ABSTRACT

The present invention relates to a sodium-sulfur dioxide secondary battery. The present invention provides a method of manufacturing a sodium-sulfur dioxide secondary battery and a configuration of the sodium-sulfur dioxide secondary battery manufactured using the method. The method includes preparing a cathode and an anode, and providing an inorganic liquid electrolyte containing sulfur dioxide ($SO_2$) and a sodium salt ($NaAlCl_4$) between the cathode and the anode.

6 Claims, 10 Drawing Sheets

(56) References Cited

FOREIGN PATENT DOCUMENTS

| | | |
|---|---|---|
| GB | 2124821 A | 2/1984 |
| JP | 51025230 | 7/1976 |
| JP | 59049159 | 3/1984 |
| JP | 2003502830 | 1/2003 |
| JP | 2012160437 A | 8/2012 |
| JP | 2013-054987 A | 3/2013 |
| JP | 2013519967 | 5/2013 |
| KR | 1020130098236 A | 9/2013 |

OTHER PUBLICATIONS

Korean Office Action for application No. 10-2013-0119666 dated Jan. 21, 2015, citing the above reference(s).
European Search Report for application No. 14182384.9 dated Feb. 4, 2015, citing the above reference(s).
Japanese Office Action for application No. 2014-173217 dated Aug. 31, 2015, citing the above reference(s).

\* cited by examiner

|  | Main Component | Note |
|---|---|---|
| Cathode | Ketjenblack 600JD | Use PTFE Binder (10%) |
| Anode | Na metal sheet | - |
| Electrolyte | $NaAlCl_4$-$xSO_2$ | x=2.0 |

| | Cathode | Cathode Binder /Content | Anode | Electrolyte | Capacity (mA h/g) | Lifespan Maintenance Ratio(%@ 50 Cycles) |
|---|---|---|---|---|---|---|
| Example 1 | KB600 | PTFE,10% | Na sheet | $NaAlCl_4 \cdot 2SO_2$ | 1800 | 83 |
| Comparative Example 2 | Super-P | PTFE,10% | Na sheet | $NaAlCl_4 \cdot 2SO_2$ | 600 | 70 |
| Comparative Example 3 | graphene | PTFE,10% | Na sheet | $NaAlCl_4 \cdot 2SO_2$ | 1600 | 30 |
| Comparative Example 4 | KB600 | PTFE,5% | Na sheet | $NaAlCl_4 \cdot 2SO_2$ | 1800 | 50 |
| Comparative Example 5 | KB600 | PTFE,15% | Na sheet | $NaAlCl_4 \cdot 2SO_2$ | 1000 | 80 |
| Comparative Example 6 | KB600 | PTFE,10% | Na sheet | $NaAlCl_4 \cdot 1SO_2$ | 500 | 60 |
| Comparative Example 7 | KB600 | PTFE,10% | Na sheet | $NaGaCl_4 \cdot 2SO_2$ | 1000 | 10 |

FIG. 11

SODIUM-SULFUR DIOXIDE SECONDARY BATTERY AND METHOD OF MANUFACTURING THE SAME

CROSS-REFERENCE TO RELATED APPLICATION

This application claims priority to and the benefit of Korean Patent Application No. 10-2013-0119666 filed in the Korean Intellectual Property Office on Oct. 8, 2013, the entire contents of which are incorporated herein by reference.

TECHNICAL FIELD

The present invention relates to a sodium-based secondary battery, and more specifically, to a sodium-sulfur dioxide secondary battery having a high energy density and electrochemical stability and a method of manufacturing the same.

BACKGROUND

Due to digitalization and high performance of electronic products, and the like, the needs of consumers have changed. Therefore, market demand is being changed to the development of batteries that are thin, lightweight, and have a high capacity according to a high energy density. Also, in order to address future energy and environment problems, the development of hybrid electric vehicles, electric vehicles, and fuel cell vehicles are actively progressing, and there is a need for a large-sized battery for vehicle power.

As a small and light battery capable of charging and discharging with a high capacity, a lithium-based secondary battery is available, and is used in portable electronic and communication devices such as a small video camera, a mobile phone, and a notebook. The lithium secondary battery includes a cathode, an anode, and an electrolyte. Lithium ions released from a cathode active material are intercalated into an anode active material during charge and desorbed during discharge. Since the ions switch between both electrodes and deliver energy, charge and discharge are possible.

Meanwhile, recently, research on a sodium-based secondary battery using sodium other than lithium has been in focus again. Since sodium is an abundant resource, when a secondary battery using sodium rather than lithium is manufactured, it may be possible to manufacture the secondary battery at a low cost.

As described above, although the sodium-based secondary battery is beneficial, sodium metal-based secondary batteries in the related art, for example, NAS (Na—S battery) and ZEBRA (Na—NiCl2 battery), are unable to be used at room temperature. That is, there is a problem of battery safety due to use of liquid sodium and a positive electrode active material at high temperatures, and a degradation in battery performance due to corrosion. Meanwhile, recent, research on a lithium ion battery using deintercalation of sodium ions has been actively progressing, but an energy density and lifespan characteristic thereof is still low. Accordingly, a sodium-based secondary battery that is able to be used at room temperature and has an excellent energy density and lifespan characteristic is necessary.

SUMMARY

The present invention provides a sodium-sulfur dioxide secondary battery and a method of manufacturing the same. In the present invention, a sulfur dioxide-based non-flammable inorganic liquid electrolyte is applied as a sodium ion conductor and an anodic reaction active material. Therefore, the battery is operated at room temperature, has a high energy and power density characteristic, is cheap, and ensures safety.

According to an aspect of the present invention, there is provided a method of manufacturing a sodium-sulfur dioxide secondary battery. The method includes preparing a cathode and an anode, and providing an inorganic liquid electrolyte containing sulfur dioxide ($SO_2$) and a sodium salt ($NaAlCl_4$) between the cathode and the anode.

Here, the sodium salt basically uses $NaAlCl_4$ among $NaAlCl_4$, $NaGaCl_4$, $Na_2CuCl_4$, $Na_2MnCl_4$, $Na_2CoCl_4$, $Na_2NiCl_4$, $Na_2ZnCl_4$, and $Na_2PdCl_4$. The other salts may be used alone or by mixing with $NaAlCl_4$.

In the inorganic liquid electrolyte, a molar ratio of $SO_2$ based on $NaAlCl_4$ may be 0.5 to 10, and more specifically, the molar ratio of $SO_2$ based on $NaAlCl_4$ may be 1.5 to 3.0.

The cathode may be made of a carbon material including 60 to 100 wt % of carbon.

In the cathode, the carbon material may include 0 to 20 at % of at least one other element, and the other element may include nitrogen (N), oxygen (O), boron (B), fluorine (F), phosphorus (P), sulfur (S), or silicon (Si).

The anode may be made of at least one of a sodium metal, a sodium-containing alloy, a sodium-containing intermetallic compound, a sodium-containing carbon material, and a sodium-containing inorganic material.

The inorganic material may include at least one of an oxide, a sulfide, a phosphide, a nitride, and a fluoride.

The anode may have 60 to 100 wt % of the anode material.

The present invention also provides a configuration of the sodium-sulfur dioxide secondary battery manufactured by the above method.

The present invention also provides a sodium-sulfur dioxide secondary battery including an anode made of a sodium-containing inorganic material, an electrolytic solution containing an electrolyte ($NaAlCl_4$) and a solvent (sulfur dioxide), and a cathode made of a carbon-based material in which NaCl is generated and decomposed according to an oxidation-reduction reaction of $NaAlCl_4$-$xSO_2$.

DETAILED DESCRIPTION

The following descriptions will be made focusing on configurations necessary for understanding operations according to embodiments of the present invention. Therefore, descriptions of other configurations that might obscure the gist of the present invention will be omitted.

Moreover, terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way. Therefore, since the embodiments described in this specification and configurations illustrated in the drawings are only exemplary embodiments and do not represent the overall technological scope of the present invention, it is understood that the present invention covers various equivalents, modifications, and substitutions at the time of filing of this application.

Hereinafter, the embodiments of the present invention will be described in detail with reference to the accompanying diagrams.

Figure 1:
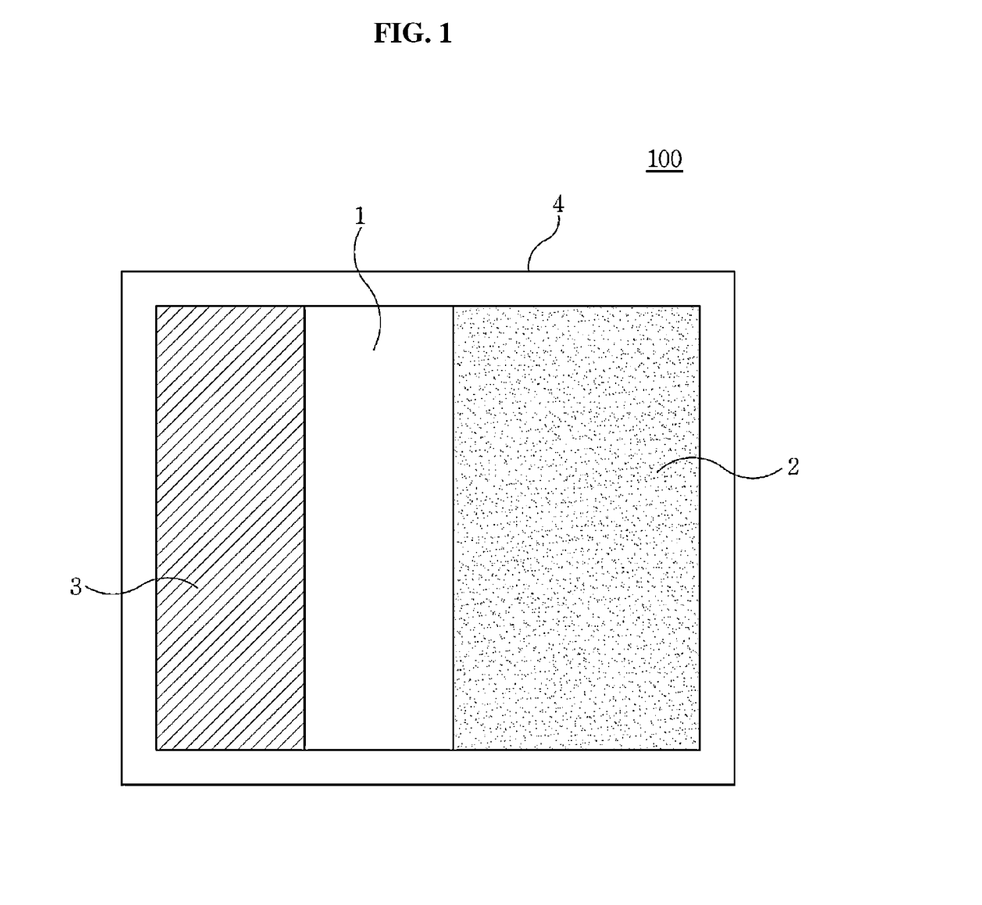
FIG. 1 is a diagram illustrating a sodium-sulfur dioxide secondary battery according to an embodiment of the present invention.

FIG. 1 is a diagram schematically illustrating a configuration of a sodium-sulfur dioxide secondary battery 100 according to an embodiment of the present invention.

As illustrated in FIG. 1, the sodium-sulfur dioxide secondary battery 100 of the present invention may include a carbon cathode 2, a sodium-containing anode 3, a sulfur dioxide ($SO_2$)-based inorganic liquid electrolyte 1, and a case 4. The sodium-sulfur dioxide secondary battery 100 having these components may be, particularly, a sodium-sulfur dioxide (Na—$SO_2$) secondary battery.

The cathode 2 is made of a porous carbon material. The carbon material cathode 2 provides a space in which an oxidation-reduction reaction of $NaAlCl_4$-$xSO_2$ occurs. The carbon material of the cathode 2 includes at least one other element in some cases. The other element includes nitrogen (N), oxygen (O), boron (B), fluorine (F), phosphorus (P), sulfur (S), or silicon (Si). A content of the other element is 0 to 20 at %, and preferably, 5 to 15 at %. When the content of the other element is less than 5 at %, an increase in a capacity resulting from adding of the other element is insignificant. When the content of the other element is 15 at % or more, electrical conductivity of the carbon material and ease of electrode forming decrease.

The anode 3 uses a sodium metal, a sodium-containing alloy, a sodium-containing intermetallic compound, a sodium-containing carbon material, or a sodium-containing inorganic material. The inorganic material includes an oxide, a sulfide, a phosphide, a nitride, a fluoride, and the like.

The sulfur dioxide-based inorganic liquid electrolyte 1 used as an electrolyte and an anodic reaction active material includes $NaAlCl_4$ (solute) and $SO_2$ (solvent). In the sulfur dioxide-based inorganic liquid electrolyte 1, a molar ratio of $SO_2$ based on $NaAlCl_4$ is 0.5 to 10, and preferably, 1.5 to 3.0. When the molar ratio of $SO_2$ is less than 1.5, electrolyte ion conductivity decreases, and when the molar ratio of $SO_2$ is greater than 3.0, a vapor pressure of the electrolyte increases. In addition to $NaAlCl_4$ used as the solute, $NaGaCl_4$, $Na_2CuCl_4$, $Na_2MnCl_4$, $Na_2CoCl_4$, $Na_2NiCl_4$, $Na_2ZnCl_4$, $Na_2PdCl_4$, and the like may be used. Among the above various solutes, $NaAlCl_4$ shows a relatively excellent battery characteristic. The sulfur dioxide-based inorganic liquid electrolyte 1 may be prepared by a method of inputting $SO_2$ gas to a mixture of NaCl and $AlCl_3$ (or a single salt of $NaAlCl_4$).

The case 4 may be provided to cover components including the cathode 2, the anode 3, and the sulfur dioxide-based inorganic liquid electrolyte 1 interposed therebetween. A signal line connected to the cathode 2 and a signal line connected to the anode 3 may be provided at a side of the case 4. A shape or a size of the case 4 may be determined according to the field to which the sodium-sulfur dioxide secondary battery 100 may be applied. A material of the case 4 may be a non-conductive material. When the cathode 2 and the anode 3 are covered by an insulator, the case 4 may also be made of a conductive material.

Figure 2:
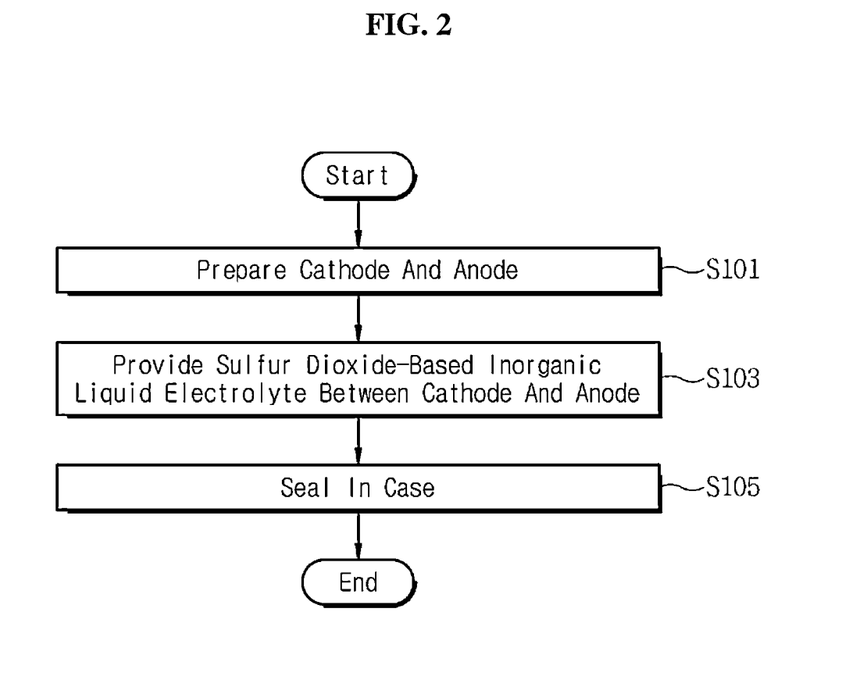
FIG. 2 is a flowchart illustrating a method of manufacturing a sodium-sulfur dioxide secondary battery according to an embodiment of the present invention.

FIG. 2 is a flowchart illustrating a method of manufacturing the sodium-sulfur dioxide secondary battery 100 according to an embodiment of the present invention.

As illustrated in FIG. 2, the method of manufacturing the sodium-sulfur dioxide secondary battery 100 of the present invention may include, an operation (S101) of preparing the cathode 2 and the anode 3, an operation (S103) of providing the sulfur dioxide-based inorganic liquid electrolyte 1 between the cathode 2 and the anode 3, and an operation (S105) of sealing the cathode 2 and the anode 3 having the sulfur dioxide-based inorganic liquid electrolyte 1 interposed therebetween in the case 4 and cutting in a predetermined shape.

In S101, the operation of preparing the cathode 2 may be an operation of preparing a carbon material in which NaCl is generated and decomposed. For example, among carbon materials such as natural graphite, artificial graphite, coke, carbon black, pyrolytic carbon, a carbon fiber, and an organic polymer compound plastic material, a carbon material in which NaCl may be generated and decomposed may be prepared. The carbon material may have, for example, any of a thin shape such as natural graphite, a bead shape such as a mesocarbon microbead, a fiber shape such as a graphitized carbon fiber, and an aggregate of fine powder. Here, the carbon material may also serve as a conductive material. That is, in the cathode 2, NaCi is generated and decomposed through an oxidation-reduction reaction of $NaAlCl_4$-$xSO_2$.

The cathode 2 includes a current collector and a cathode active material layer having a cathode active material and a binding agent formed on a surface of the current collector. As described above, the cathode active material layer includes the cathode active material and the binding agent. Hereinafter, the cathode active material, the binding agent, and other components included in the cathode active material layer will be described.

When the carbon material is used as the cathode active material, it is possible to suppress a degradation in battery performance. A preferred content of the carbon material of the cathode active material is 60 to 100 wt % based on a mass of the cathode active material layer. The carbon material may include 0 to 20 at % of at least one other element. Here, the other element may include nitrogen (N), oxygen (O), boron (B), fluorine (F), phosphorus (P), sulfur (S), or silicon (Si).

The binding agent to be used is not specifically limited, and binding agents known in the related art may be used. Specifically, polyvinylidene fluoride (hereinafter referred to as PVDF), polytetrafluoroethylene (hereinafter referred to as PTFE), copolymers of tetrafluoroethylene, hexafluoropropylene, and vinylidene fluoride, copolymers of hexafluoropropylene and vinylidene fluoride, copolymers of tetrafluoroethylene and perfluorinated vinyl ether, and the like may be used. These are used alone or in mixtures thereof. Examples of the binding agent may include polysaccharides such as a starch, methyl cellulose, carboxymethyl cellulose, hydroxymethyl cellulose, hydroxyethyl cellulose, hydroxypropylcellulose, carboxymethylhydroxyethyl cellulose, and nitrocellulose, and derivatives thereof. Also, examples of the binding agent may include inorganic minute particles such as colloidal silica. Preferably, a content of the binding agent is 20 to 1 mass % based on a mass of the cathode active material layer, and more preferably, 10 to 1 mass %.

The cathode active material layer may further include other components as necessary in addition to the binding agent and the cathode active material, as long as effects of the present invention are not interfered with. For example, a conducting material, a binding agent, and an ion conductive polymer may be included. Also, when the ion conductive polymer is included, a polymerization initiator for polymerizing the polymer may be included. Also, a mixing ratio of these components is not specifically limited and may be adjusted by appropriately referring to ratios known for the sodium-based secondary battery.

The current collector is made of a thin, mesh, expanded grid (expanded metal), and punched metal using a conductive material such as nickel, copper, and stainless steel (SUS). Knots of a mesh, a diameter of a line, the number of meshes, and the like are not specifically limited, and may use configurations known in the related art. A size of the current collector is determined according to purposes of use of the battery. When a large electrode used in a large battery is manufactured, a current collector having a large area is used. When a small electrode is manufactured, a current collector having a small area is used.

The cathode may be manufactured such that, for example, cathode active material slurry including the cathode active material, the binding agent, and the solvent is prepared, and the cathode active material is applied onto the current collector, dried, and then pressed.

In S101, in the operation of preparing the anode 3, a sodium metal, a sodium-containing alloy, a sodium-containing intermetallic compound, or a sodium-containing inorganic material is prepared. A content of an anode material in the anode 3 may be 60 to 100 wt %.

In S103, in the operation of preparing and providing the sulfur dioxide-based inorganic liquid electrolyte 1, sulfur dioxide ($SO_2$) and sodium salt ($NaAlCl_4$) are prepared. Here, as the sodium salt, $NaAlCl_4$, $NaGaCl_4$, $Na_2CuCl_4$, $Na_2MnCl_4$, $Na_2CoCl_4$, $Na_2NiCl_4$, $Na_2ZnCl_4$, $Na_2PdCl_4$, and the like may be used. In the sulfur dioxide-based inorganic liquid electrolyte 1, a molar ratio of $SO_2$ based on $NaAlCl_4$ is 0.5 to 10, and preferably, 1.5 to 3.0.

In S105, the sodium-sulfur dioxide secondary battery may be manufactured by, for example, sequentially laminating the anode 3, the sulfur dioxide-based inorganic liquid electrolyte 1, and the cathode 2 in the case 4. In this process, the anode 3 and the cathode 2 are provided in the case 4 at a predetermined interval, the sulfur dioxide-based inorganic liquid electrolyte 1 is injected between the anode and the cathode, and then the case 4 is sealed to manufacture the battery.

The manufactured sodium-sulfur dioxide secondary battery 100 has a cross section having a shape of a circle, an ellipse, a long circle, a rectangle, a rectangle with rounded corners, and the like. Also, a shape of the battery may include, for example, a paper shape, a coin shape, a cylindrical shape, and an angular shape.

Figure 3:
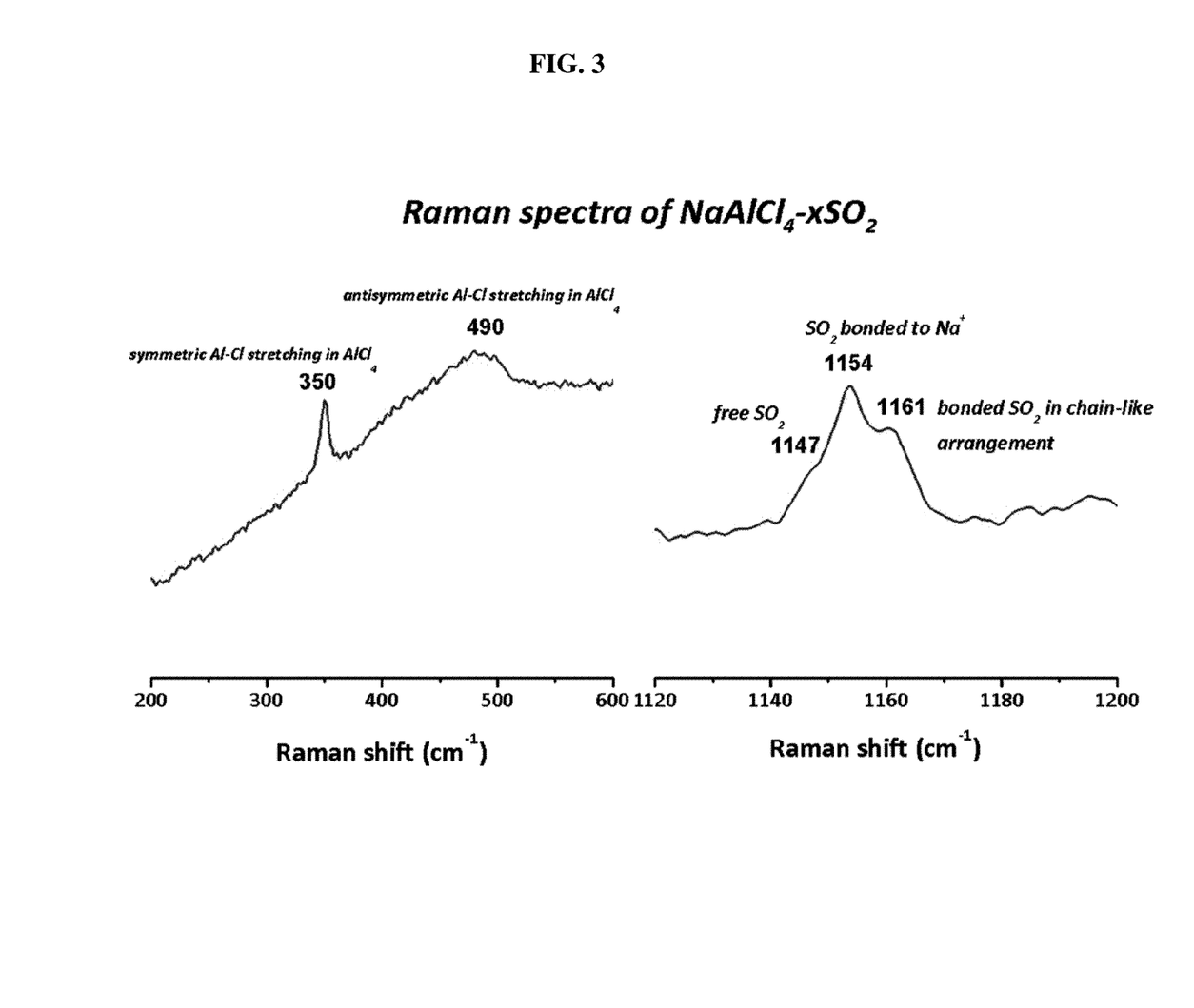
FIG. 3 is a diagram illustrating the results of Raman spectra analysis of $NaAlCl_4$-$xSO_2$ electrolytes.
Figure 4:
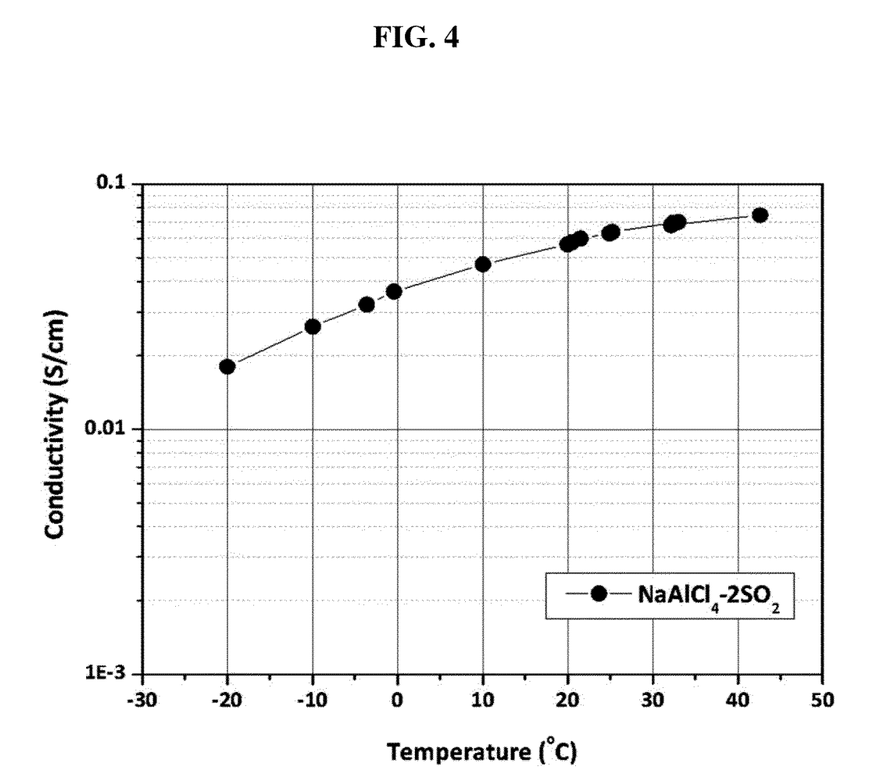
FIG. 4 is a diagram illustrating ion conductivity of a $NaAlCl_4$-$2SO_2$ electrolytic solution.

FIG. 3 illustrates the results of Raman spectra analysis of $NaAlCl_4$-$xSO_2$ electrolytes. FIG. 4 is a diagram illustrating ion conductivity of a $NaAlCl_4$-$2SO_2$ electrolytic solution.

The sulfur dioxide-based inorganic liquid electrolyte 1 may be prepared by a method of inputting $SO_2$ gas to a mixture of NaCl and $AlCl_3$ (or a single salt of $NaAlCl_4$). As illustrated in FIGS. 3 and 4, the $NaAlCl_4$-$2SO_2$ electrolytic solution shows a high sodium ion conductivity characteristic, closer to 0.1 S/cm, and maintains a liquid state showing a relatively high conductivity at low temperatures.

Figure 5:
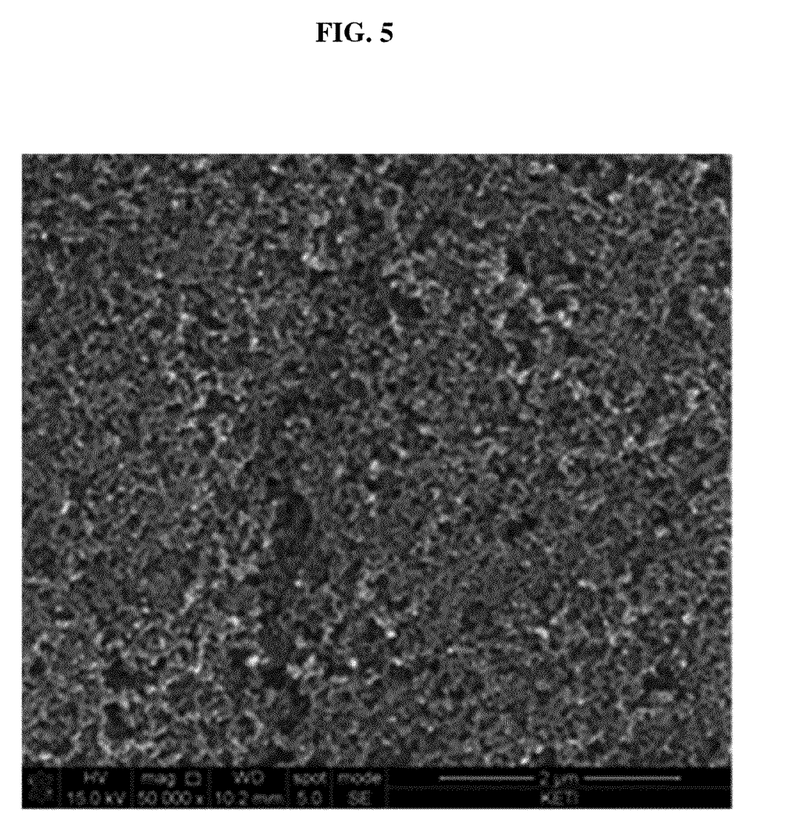
FIG. 5 shows a scanning electron microscope picture of a cathode according to an embodiment of the present invention.

FIG. 5 shows a scanning electron microscope picture of a cathode according to an embodiment of the present invention.

As shown in FIG. 5, the cathode 2 is made of a porous carbon material. The carbon material cathode 2 provides a space in which an oxidation-reduction reaction of $NaAlCl_4$-$xSO_2$ occurs. The carbon material of the cathode 2 includes at least one other element in some cases. The other element includes nitrogen (N), oxygen (O), boron (B), fluorine (F), phosphorus (P), sulfur (S), or silicon (Si). A content of the other element is 0 to 20 at %, and preferably, 5 to 15 at %. When the content of the other element is less than 5 at %, an increase in a capacity resulting from adding of the other element is insignificant. When the content of the other element is 15 at % or more, electrical conductivity of the carbon material and ease of electrode forming decrease.

The anode 3 uses a sodium metal, a sodium-containing alloy, an intermetallic compound, or an inorganic material. The inorganic material includes carbon, an oxide, a sulfide, a phosphide, a nitride, a fluoride, and the like.

Figure 6:
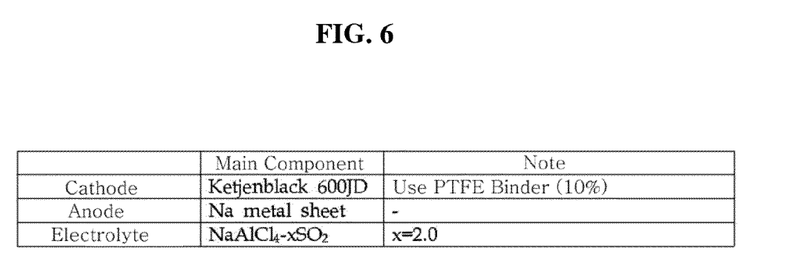
FIG. 6 is a diagram illustrating a charge-discharge curve of a Na—$SO_2$ battery made of battery components of the present invention.
Figure 7:
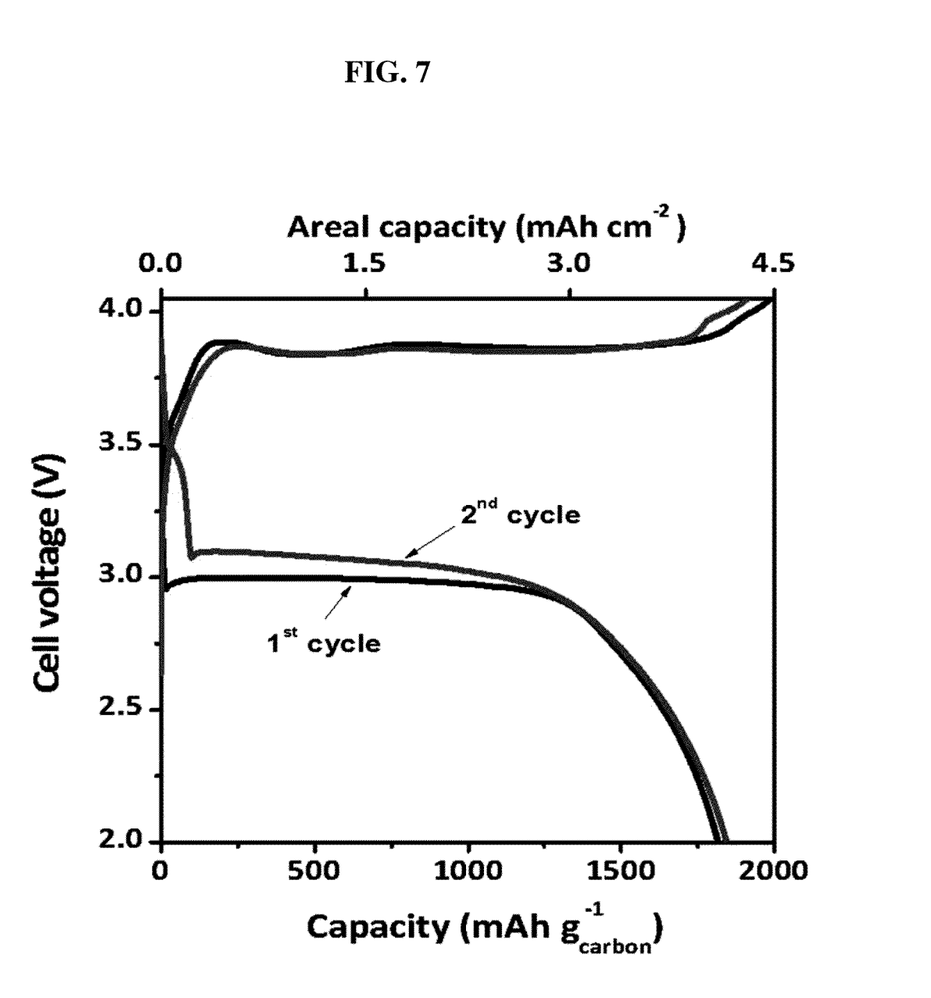
FIG. 7 is a diagram illustrating conditions of a battery configuration according to an embodiment of the present invention.

FIG. 6 illustrates a charge-discharge curve of the Na—$SO_2$ battery made of battery components (an electrolytic solution, a cathode, and an anode) of the present invention. FIG. 7 illustrates conditions of a battery configuration according to an embodiment.

As illustrated in FIGS. 6 and 7, battery performance of a representative Na—$SO_2$ battery including the $NaAlCl_4$-$2SO_2$ electrolytic solution, the carbon material cathode 2, and the sodium metal anode 3 shows an excellent battery capacity and operating voltage. A battery configuration and electrode/electrolyte conditions of Example 1 of the present invention are illustrated in FIG. 6. A high capacity of 1800 mAh/g based on a carbon capacity and 4.1 mAh/cm$^2$ based on an electrode area is shown. The operating voltage is about 3 V, and a high energy density is shown, compared to the sodium-based secondary battery in the related art.

Figure 8:
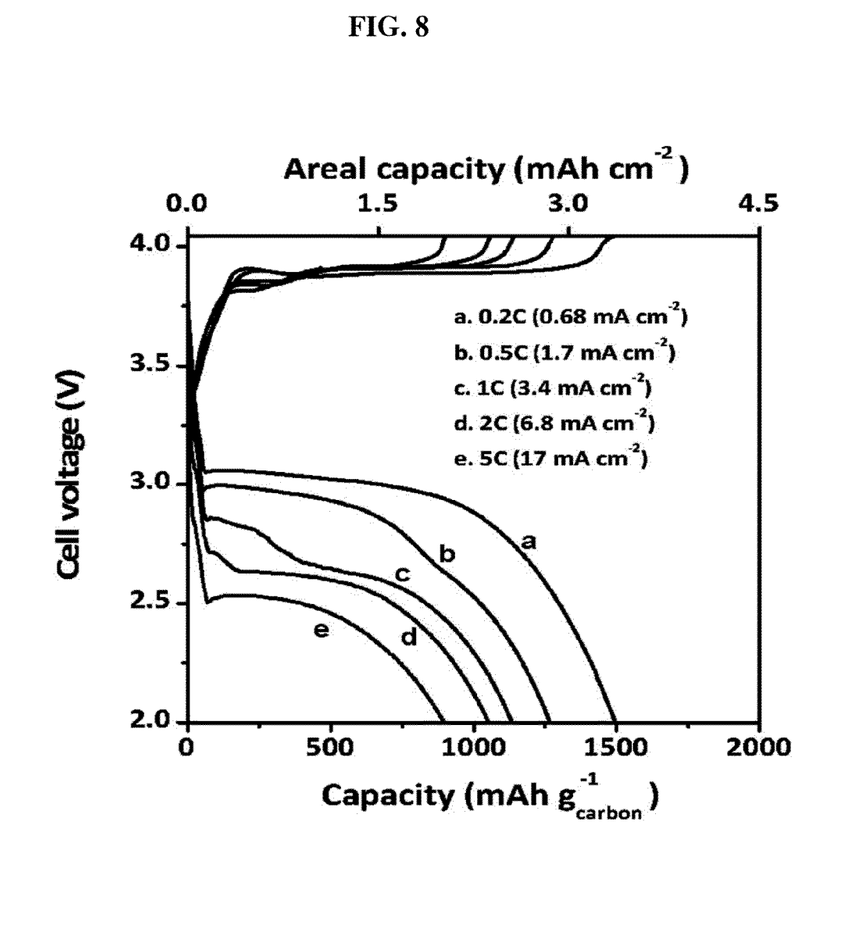
FIG. 8 is a diagram illustrating characteristics of a secondary battery for each ratio according to an embodiment of the present invention.

FIG. 8 illustrates characteristics of a secondary battery for each ratio according to an embodiment of the present invention.

As illustrated in FIG. 8, in characteristics of the sodium-sulfur dioxide secondary battery for each ratio of the present invention, an excellent characteristic having a capacity of about 900 mAh/g at a high discharge current of 5C (=7.5 A/g) is shown.

Figure 9:
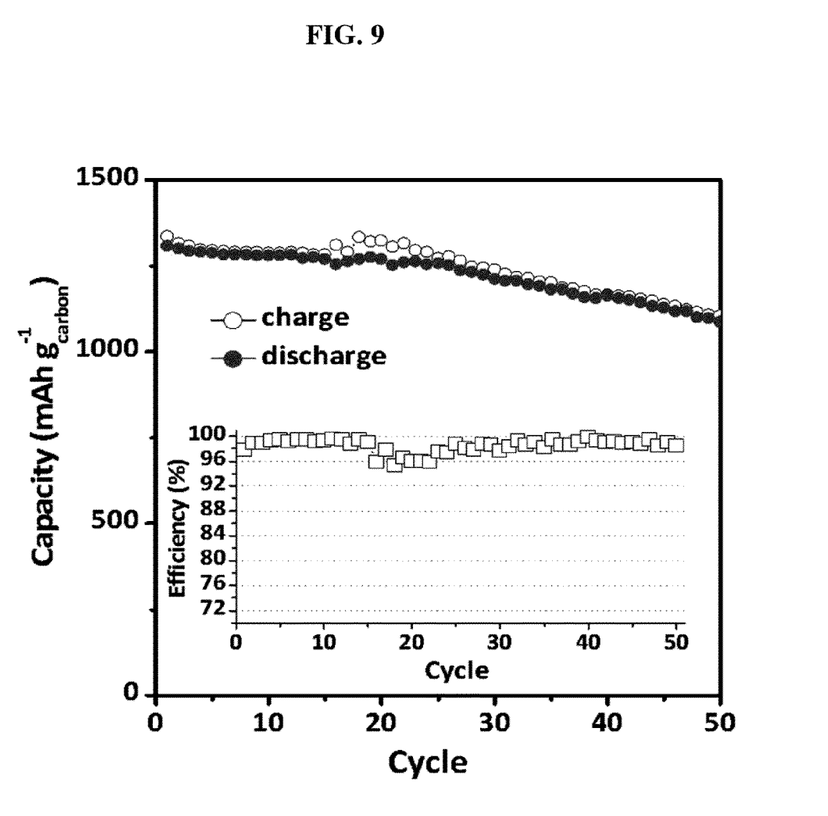
FIG. 9 is a diagram illustrating a Na—$SO_2$ lifespan characteristic.

FIG. 9 is a diagram illustrating a Na—$SO_2$ lifespan characteristic.

As illustrated in FIG. 9, when charge and discharge are performed 50 times, a capacity maintenance characteristic of about 83% based on an initial capacity is shown, and reversible efficiency for each cycle also has a high efficiency value of about 99% on average. This lifespan characteristic is more excellent than that of a sodium-sulfur dioxide secondary battery in the related art that is operated at room temperature.

Figure 10:
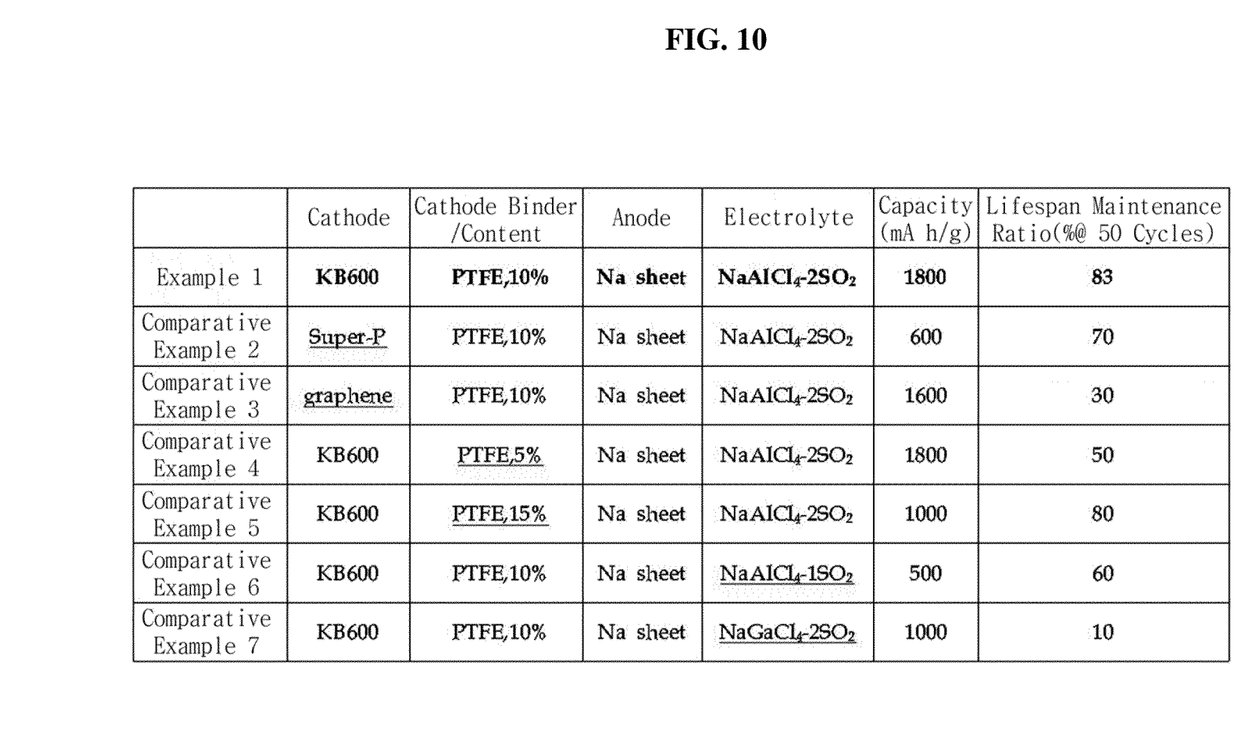
FIG. 10 is a diagram illustrating comparison of battery capacities and lifespan characteristics according to electrodes and compositions of the electrolytic solution.

FIG. 10 is a diagram illustrating comparison of battery capacities and lifespan characteristics according to electrodes and compositions of the electrolytic solution.

As illustrated in FIG. 10, different battery characteristics are shown according to various types of carbon materials, types and contents of binders, compositions of electrolytes, and the like. The most excellent battery characteristic is observed when Ketjenblack 600JD (KB600) carbon, a PTFE binder (10%), and a $NaAlCl_4$-$2SO_2$ electrolyte are used.

Figure 11:
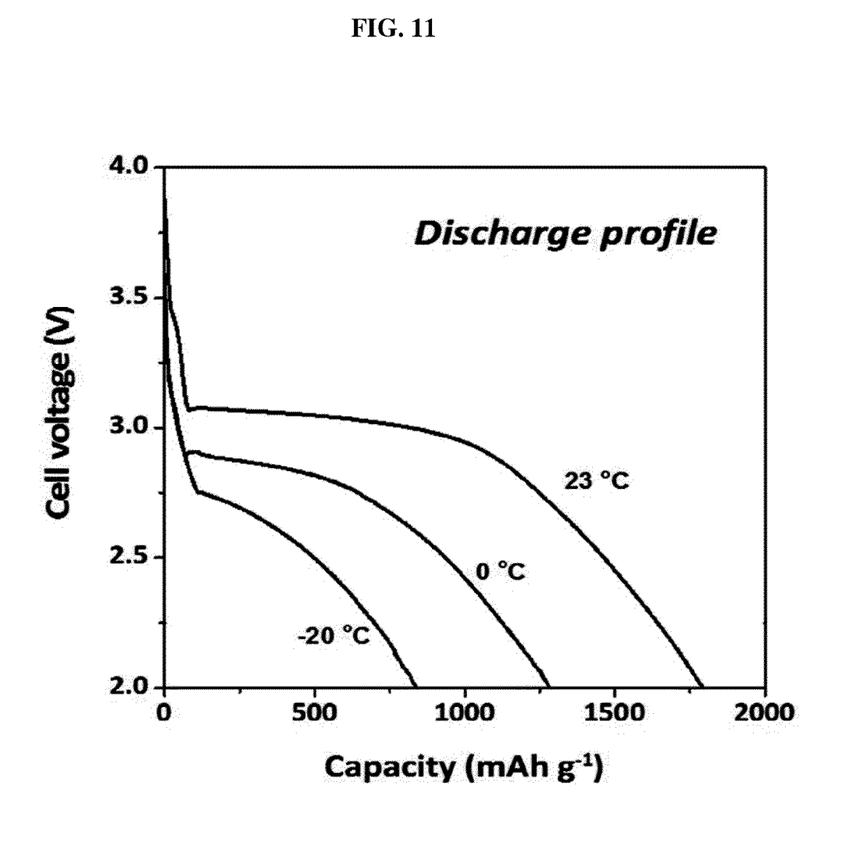
FIG. 11 is a diagram illustrating charge-discharge characteristics of a Na—$SO_2$ battery at low temperatures.

FIG. 11 illustrates charge-discharge characteristics of the Na—$SO_2$ battery at low temperatures.

As illustrated in FIG. 11, the sodium-sulfur dioxide secondary battery 100 of the present invention shows an excellent discharge capacity at 0° C. and even at −20° C. This results from an excellent ion conductivity characteristic at low temperatures of $NaAlCl_4$-$2SO_2$ used in the battery. Compared to a sodium secondary battery operated at high temperatures in the related art such as Na—S (NAS) and Na—$NiCl_2$ (ZEBRA) batteries, an excellent operation characteristic at room temperature in addition to low temperatures is shown.

According to the sodium-sulfur dioxide secondary battery of the present invention and the method of manufacturing the same, the present invention applies a sodium-based inorganic liquid electrolyte based on a sulfur dioxide as an ion conductor and an anodic reaction active material. Therefore, compared to sodium secondary batteries in the related art, it is possible to increase the expansion of a secondary battery for storing energy that is operated at room temperature, has a high energy density and a high power density, and ensures safety, and is cheap.

The embodiments disclosed in this specification and drawings are only examples to help understanding of the invention and the invention is not limited thereto. It is apparent to those skilled in the art that various modifications based on the technological scope of the invention in addition to the embodiments disclosed herein can be made.

What is claimed is:

1. A method of manufacturing a sodium-sulfur dioxide secondary battery, the method comprising:
   preparing a cathode comprising a carbon material, the carbon material includes 5 to 15 at % of heteroatom-doped element, wherein the heteroatom-doped element includes one or more of nitrogen (N), oxygen (O), boron (B), fluorine (F), phosphorus (P), sulfur (S), and silicon (Si);
   preparing an anode made of a sodium-containing inorganic material; and
   providing an inorganic liquid electrolyte containing sulfur dioxide ($SO_2$) and a sodium salt between the cathode and the anode.

2. The method of claim 1,
   wherein the sodium salt comprises $NaAlCl_4$.

3. The method of claim 1,
   wherein, in the inorganic liquid electrolyte, a molar ratio of $SO_2$ based on the sodium salt is 1.5 to 3.0.

4. The method of claim 1,
   wherein the anode comprises at least one of a sodium metal, a sodium-containing alloy, a sodium-containing intermetallic compound, a sodium-containing carbon material, and a sodium-containing inorganic material, and
   wherein the inorganic material comprises at least one of an oxide, a sulfide, a phosphide, a nitride, and a fluoride.

5. The method of claim 1,
   wherein the sodium salt comprises at least one of $NaGaCl_4$, $Na_2CuCl_4$, $Na_2MnCl_4$, $Na_2CoCl_4$, $Na_2NiCl_4$, $Na_2ZnCl_4$, and $Na_2PdCl_4$.

6. A sodium-sulfur dioxide secondary battery, comprising:
   an anode comprising a sodium-containing inorganic material;
   an electrolytic solution containing an electrolyte ($NaAlCl_4$) and a solvent (sulfur dioxide),
      wherein the electrolyte comprises $NaAlCl_4$, and the solvent comprises sulfur dioxide ($SO_2$); and
   a cathode comprising a carbon-based material in which NaCl is generated and decomposed according to an oxidation-reduction reaction of $NaAlCl_4$-$xSO_2$,
      wherein the carbon material includes 5 to 15 at % of heteroatom-doped element,
      wherein the heteroatom-doped element includes one or more of nitrogen (N), oxygen (O), boron (B), fluorine (F), phosphorus (P), sulfur (S), and silicon (Si).

* * * * *